(12) United States Patent
Shiobara et al.

(10) Patent No.: US 8,476,801 B2
(45) Date of Patent: Jul. 2, 2013

(54) STATOR, AND STATOR MANUFACTURING APPARATUS

(75) Inventors: Hitoshi Shiobara, Utsunomiya (JP);
Mamoru Sasaki, Tochigi-gun (JP);
Kenji Misao, Tochigi-ken (JP);
Mitsuhiro Yamada, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 336 days.

(21) Appl. No.: 12/937,086

(22) PCT Filed: Mar. 16, 2009

(86) PCT No.: PCT/JP2009/055073
§ 371 (c)(1),
(2), (4) Date: Oct. 8, 2010

(87) PCT Pub. No.: WO2009/125655
PCT Pub. Date: Oct. 15, 2009

(65) Prior Publication Data
US 2011/0025163 A1    Feb. 3, 2011

(30) Foreign Application Priority Data
Apr. 9, 2008  (JP) .................................. 2008-101165

(51) Int. Cl.
*H02K 3/28* (2006.01)
(52) U.S. Cl.
USPC .......................................... 310/198; 310/208
(58) Field of Classification Search
USPC ........................... 310/179, 194, 198, 208, 210
See application file for complete search history.

(56) References Cited

U.S. PATENT DOCUMENTS

| | | | | |
|---|---|---|---|---|
| 3,629,024 A | * | 12/1971 | Kimura et al. | 156/56 |
| 6,281,612 B1 | * | 8/2001 | Asao et al. | 310/179 |
| 2006/0197398 A1 | * | 9/2006 | Maynez | 310/198 |

FOREIGN PATENT DOCUMENTS

| | | | |
|---|---|---|---|
| JP | 09140079 | * | 11/1995 |
| JP | 09-140079 | | 5/1997 |
| JP | 09-140079 | * | 5/1997 |

OTHER PUBLICATIONS

English translation from JPO website of JP 09140079 A.*
JPO machine translation into english of JP09-140079, May 1997, Matsui et al.*

* cited by examiner

*Primary Examiner* — John K Kim
*Assistant Examiner* — Naishadh Desai
(74) *Attorney, Agent, or Firm* — Rankin, Hill & Clark LLP

(57) ABSTRACT

An apparatus for manufacturing a stator. On a split core of the stator, there are wound main conductors and two auxiliary conductors, which are thinner than but correspond to the main conductors. These main conductors are arrayed and wound in a plurality of layers, such that the main conductors of an upper layer are arranged in the valleys between the adjoining main conductors of a layer. For the main conductors of a first layer, the auxiliary conductors are arranged in a first space and a second space. For the main conductors of the second and subsequent layers, the auxiliary conductors are arranged in a third space, and the auxiliary conductors are arranged in a fourth space.

4 Claims, 17 Drawing Sheets ical Field

The present invention relates to a stator for use in a rotary electric machine such as an electric motor, an electric generator, or the like, and an apparatus for manufacturing such a stator, and more particularly to a stator having conductive wires wound as turns arranged in arrays to produce coils with a high space factor, and an apparatus for manufacturing such a stator.

BACKGROUND ART

Heretofore, there has been known a stator fabricated by preparing separate cores each comprising an arcuate yoke and a pole extending radially from the yoke, winding conductive wires around the poles of the separate cores with insulating bobbins interposed therebetween, to produce coils on the poles, and assembling the separate cores with the coils thereon into an annular assembly.

For the purpose of increasing the performance of rotary electric machines which incorporate such a stator, research and development efforts have been made to increase the number of wires of the coils wound around the separate cores to achieve an increased space factor in the slots between the poles. In one of such efforts, it has been proposed to increase the space factor by winding thin wires in spaces between the coil wires, as disclosed in Japanese Laid-Open Patent Publication No. 09-140079.

According to Japanese Laid-Open Patent Publication No. 09-140079, as shown in FIG. 17 of the accompanying drawings, a coil comprises a thick wire 902, a thin wire 904, a thick wire 906, and a thin wire 908 which are wound in multiple layers around a bobbin 900 and have ends connected to three terminals, not shown. The thick wire 902 and the thin wire 904 are wound in a pair, and the thick wire 906 and the thin wire 908 are wound in a pair. The thin wires 904, 908 have turns disposed in substantially square spaces defined between four turns of the thick wires 902, 906. The thick wires 902, 906 and the thin wires 904, 908 have a diameter ratio of 1:0.4

According to the coil described in Japanese Laid-Open Patent Publication No. 09-140079, the turns in the respective layers of the thick wires 902, 906 as main wires are held in alignment with each other. Therefore, the turns in one layer of the thick wires 902, 906 are kept in point contact with the respective turns in a lower layer of the thick wires 902, 906. The stacked turns of the thick wires 902, 906 are thus relatively unstable positionally. The turns in the second and subsequent layers of the thick wires 902, 906 are particularly unstable because they are more likely to slip into the spaces between the turns in the lower layers of the thick wires 902, 906 as they are wound under higher tension.

The coil has a considerably high space factor with the thin wires 904, 908 being disposed in the gaps between the thick wires 902, 906. However, there is a demand in the art for a stator having a higher space factor.

DISCLOSURE OF THE INVENTION

It is an object of the present invention to provide a stator having coils with a high space factor and an apparatus for manufacturing such a stator.

According to the present invention, there is provided a stator comprising a coil of conductive wires wound around a bobbin, wherein the conductive wires include a main conductive wire and a first auxiliary conductive wire and a second auxiliary conductive wire associated with the main conductive wire and being thinner than the main conductive wire, wherein the main conductive wire is wound as turns arranged in arrays in a plurality of layers including first, second, and subsequent layers, with adjacent turns of the main conductive wire in one of the layers defining a valley therebetween which accommodates therein a turn of the main conductive wire in an upper layer above the one of the layers, wherein the first auxiliary conductive wire and the second auxiliary conductive wire which are associated with one of the turns of the main conductive wire in the first layer are wound as turns disposed in a first space and a second space that are surrounded by adjacent turns of the main conductive wire in the first layer and the bobbin, and wherein the first auxiliary conductive wire and the second auxiliary conductive wire which are associated with one of the turns of the main conductive wire in each of the second and subsequent layers are wound as turns disposed in a third space and a fourth space, respectively, the third space being surrounded by adjacent turns of the main conductive wire in a lower layer of one of the layers, and the fourth space being surrounded by an adjacent turn of the main conductive wire in the one of the layers and an adjacent turn of the main conductive wire in the lower layer.

According to the present invention, the turns of the first and second auxiliary conductive wires can efficiently be packed in the spaces between the turns of the main conductive wires that are wound in arrays. The spaces between the coil turns are reduced in cross-sectional area, and the space factor of the coil is increased. Therefore, a rotary electric machine incorporating the stator therein has increased performance and output levels.

The turns of the first auxiliary conductive wire and the second auxiliary conductive wire which are associated with one of the turns of the main conductive wire in the first layer may be disposed in respective positions that are disposed on opposite sides of and angularly spaced by identical angles from a line which extends through the center of the one of the turns of the main conductive wire normal to a surface of the bobbin on which the coil is wound, and the turns of the first auxiliary conductive wire and the second auxiliary conductive wire which are associated with one of the turns of the main conductive wire in the second and subsequent layers may include a turn disposed on the line and another turn disposed in a position that is angularly spaced by 60° from the line. Consequently, the first and second auxiliary conductive wires are efficiently wound well in balance for an increased space factor.

According to the present invention, there is also provided an apparatus for manufacturing a stator, comprising a conductive wire supply for supplying conductive wires, a nozzle mechanism for guiding the conductive wires from the conductive wire supply to a bobbin, and bobbin rotating means for rotating the bobbin while the conductive wires are being guided thereto by the nozzle mechanism, wherein the conductive wires include a main conductive wire and a first auxiliary conductive wire and a second auxiliary conductive wire associated with the main conductive wire and being thinner than the main conductive wire, and wherein the nozzle mechanism comprises a main nozzle for guiding the main conductive wire, two auxiliary nozzles circumferentially movable around the main conductive wire guided by the main nozzle, for guiding the first auxiliary conductive wire and the second auxiliary conductive wire, respectively, and nozzle moving means for moving the auxiliary nozzles independently of each other, wherein the auxiliary nozzles change respective angular positions when the nozzle mechanism starts winding the conductive wires as turns in a second layer around the bobbin after winding the conductive wires as turns in a first layer around the bobbin.

According to the present invention, when the winding process shifts from the first layer to the second layer, the auxiliary nozzles change their angular positions, so that the turns of the first and second auxiliary conductive wires can efficiently be packed in the spaces between the turns of the main conductive wires that are wound in arrays. The spaces between the coil turns are reduced in cross-sectional area, and the space factor of the coil is increased. Therefore, a rotary electric machine incorporating the stator therein has increased performance and output levels.

If an existing stator manufacturing apparatus is modified by replacing its nozzle mechanism with the above nozzle mechanism, then it is capable of manufacturing a stator having a high space factor.

The nozzle moving means may comprise two rotors fitted over the main nozzle and individually rotatable about the main nozzle, for simply and appropriately guiding the first auxiliary conductive wire and the second auxiliary conductive wire.

Each of the first auxiliary conductive wire and the second auxiliary conductive wire may have a hexagonal cross section. The auxiliary nozzles may have a hexagonal cross section for guiding the first auxiliary conductive wire and the second auxiliary conductive wire, respectively, and may be rotatably mounted on the rotors, respectively. The apparatus may further comprise an angle adjusting mechanism for rotating the auxiliary nozzles to keep the first auxiliary conductive wire and the second auxiliary conductive wire in a first predetermined orientation while the conductive wires are being wound in the first layer around the bobbin, and in a second predetermined orientation while the conductive wires are being wound in the second and subsequent layers around the bobbin.

The angle adjusting mechanism is effective to reduce damage on the first and second auxiliary conductive wires, e.g., damage on the insulating coatings on the surfaces of the first and second auxiliary conductive wires for thereby increasing the quality of the stator. The angle adjusting mechanism is also effective to set the first and second auxiliary conductive wires stably.

With the stator according to the present invention, the turns of the auxiliary conductive wires can efficiently be packed in the spaces between the turns of the main conductive wires that are wound in arrays. The spaces between the coil turns are reduced in cross-sectional area, and the space factor of the coil is increased. Therefore, a rotary electric machine incorporating the stator therein has increased performance and output levels.

The above and other objects, features, and advantages of the present invention will become more apparent from the following description when taken in conjunction with the accompanying drawings in which preferred embodiments of the present invention are shown by way of illustrative example.

BEST MODE FOR CARRYING OUT THE INVENTION

Stators and stator manufacturing apparatus according to preferred embodiments of the present invention will be described below with reference to FIGS. 1 through 16. A stator 10 according to a first embodiment of the present invention and a stator 200 according to a second embodiment of the present invention are used in a rotary electric machine such as an electric motor, an electric generator, or the like. First, the stator 10 according to the first embodiment will be described below.

Figure 1:
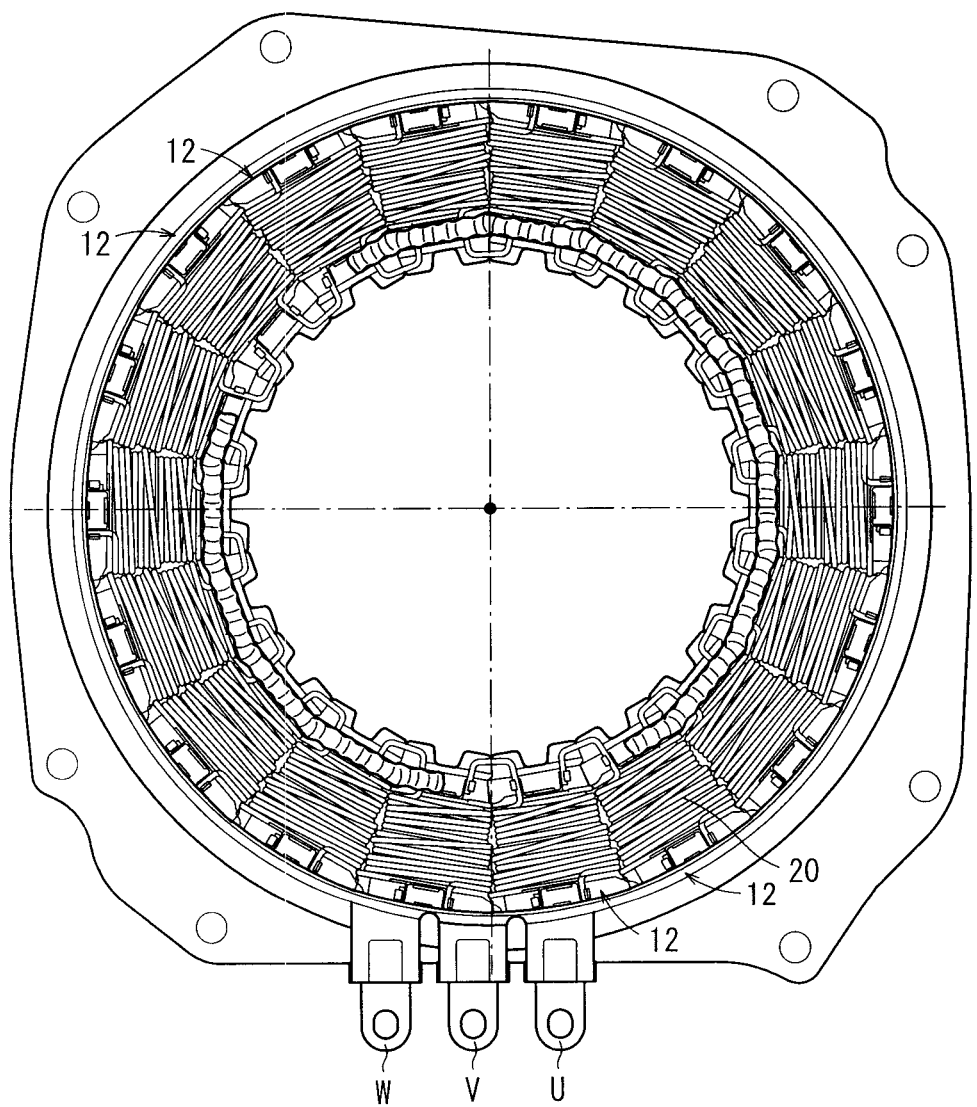
FIG. 1 is a plan view of a stator according to a first embodiment of the present invention.

As shown in FIG. 1, the stator 10 is a three-phase stator having input terminals U, V, W in three phases and a plurality of separate cores 12 arranged in an annular array. The stator 10 is combined with a rotor, not shown, making up a three-phase rotary electric machine. The stator 10 may be in a wye connection or a delta connection. The stator 10 may not be a three-phase stator.

Figure 2:
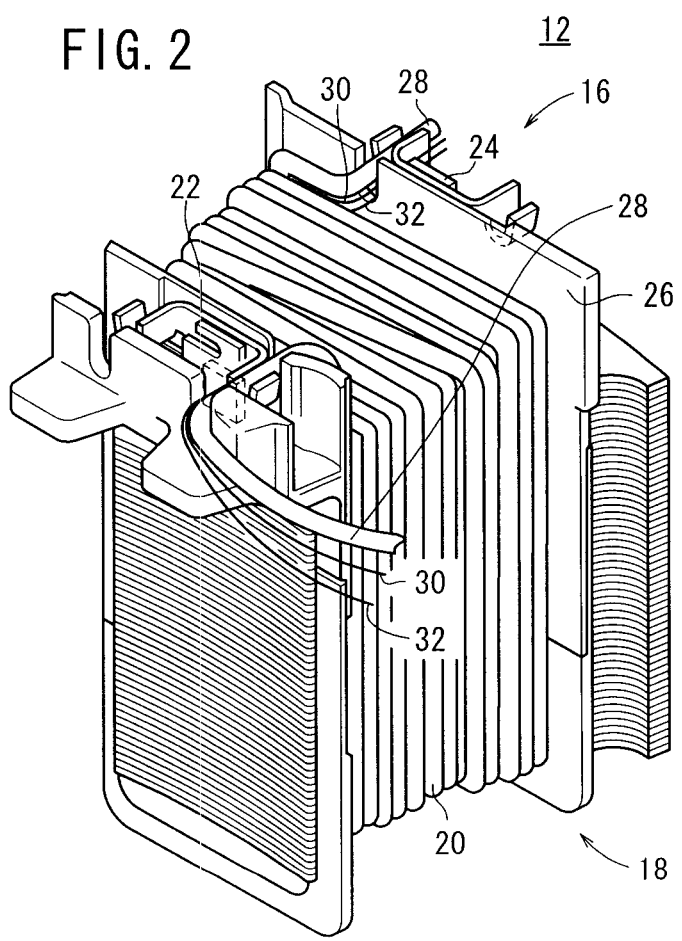
FIG. 2 is a perspective view of a separate core.
Figure 3:
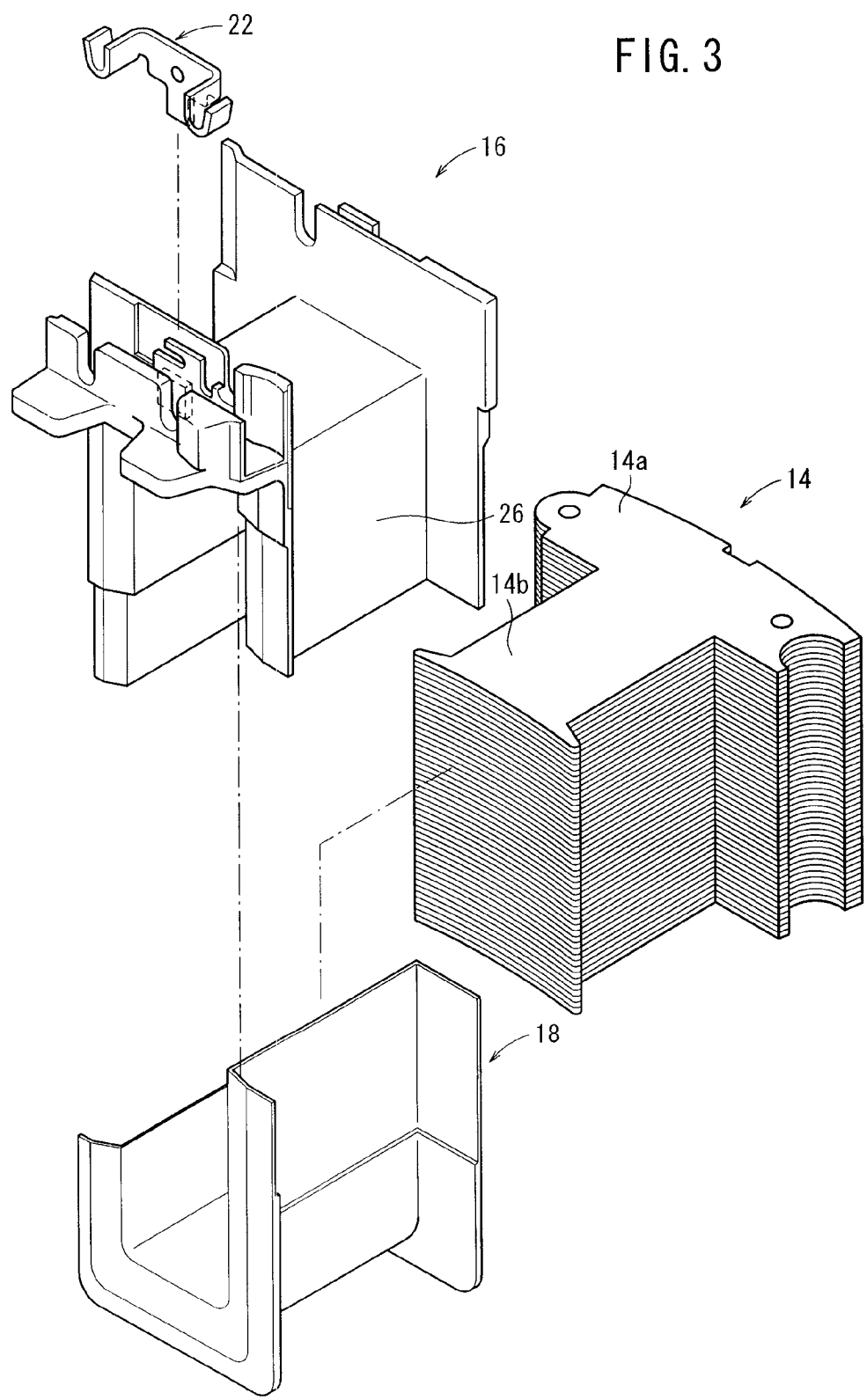
FIG. 3 is an exploded perspective view of the separate core.

As shown in FIGS. 2 and 3, each of the separate cores 12, before they are assembled into the stator 10, comprises a laminated steel sheet assembly 14 made up of a plurality of substantially T-shaped steel sheets produced by a blanking press and integrally put together by crimping, a pair of insulators 16, 18 mounted on the laminated steel sheet assembly 14 to insulate the laminated steel sheet assembly 14, a coil 20 wound around the insulators 16, 18 on the laminated steel sheet assembly 14, and a pair of metal terminals 22, 24 electrically connected to the coil 20. The insulators 16, 18 jointly make up a bobbin 26 on which the coil 20 is mounted.

The laminated steel sheet assembly 14 is substantially in the shape of a T as viewed in plan, and includes a portion 14a corresponding to the horizontal stroke of the letter "T" which serves as a yoke of the stator 10 and a portion 14*b* corresponding to the vertical stroke of the letter "T" which serves as a pole of the stator 10.

Figure 4:
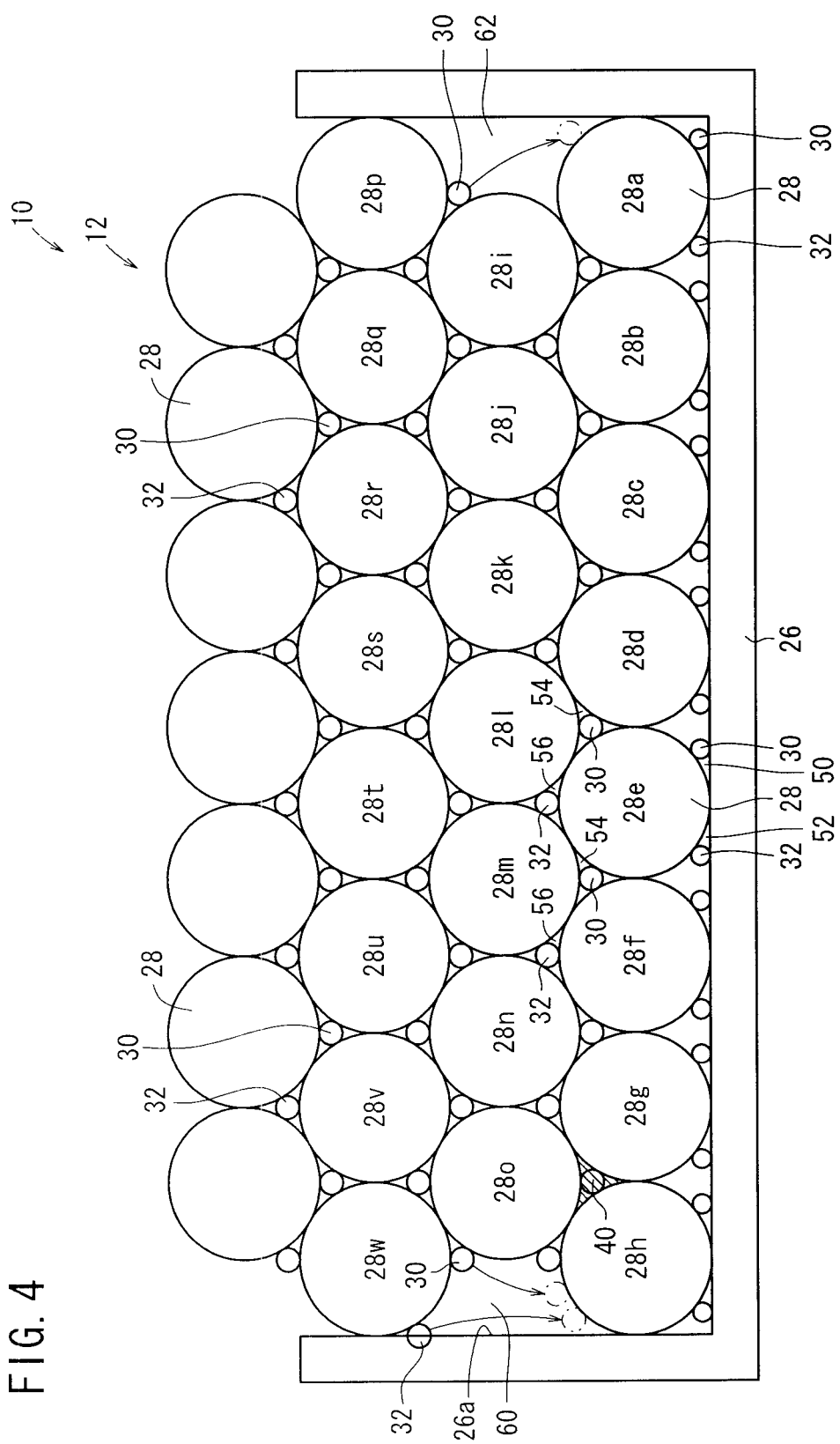
FIG. 4 is a cross-sectional view of a coil according to the first embodiment.

As shown in FIG. 4, the coil 20 comprises a single main conductive wire 28 and two auxiliary conductive wires (first and second auxiliary conductive wires) 30, 32. The auxiliary conductive wires 30, 32 are of a circular cross section. Each of the main and auxiliary conductive wire 28, 30, 32 has an insulating coating therearound. The main conductive wire 28 has turns arrayed in a plurality of layers. Adjacent two of the turns of the main conductive wire 28 in each layer have their lateral ends held in contact with each other. Adjacent turns of the main conductive wire 28 which are disposed in adjacent layers are displaced from each other by a distance which is one-half (R/2) of the diameter R of the main conductive wire 28, and are held in contact with each other in respective positions that are angularly spaced from each other by 60°. In other words, adjacent turns of the main conductive wire 28 in one layer define a valley therebetween which accommodates therein a turn of the main conductive wire 28 in the upper layer. Each of turns of the main conductive wire 28 in each of the second and subsequent layers, except the first layer disposed on the bottom of the bobbin 26, is held in contact with two turns of the main conductive wire 28 in the lower layer at two points. Accordingly, the turns of the main conductive wire 28 are stably positioned in the bobbin 26. The tension that is applied to main conductive wire 28 when it is wound around the bobbin 26 can thus be appropriately increased.

The main conductive wire 28 and the auxiliary conductive wires 30, 32 may be electrically connected to each other in any patterns. For example, they may be electrically connected parallel to each other. A means for adjusting the impedance of the coil 20 may be connected to the main conductive wire 28 and the auxiliary conductive wires 30, 32.

The auxiliary conductive wires 30, 32 are identical in diameter to each other, and have the maximum diameter with which each turn of the auxiliary conductive wires 30, 32 can be placed in a space 40 (see FIG. 4) that is defined by a triad of turns of the main conductive wires 28 in one and upper layers. Sets of two turns of the auxiliary conductive wires 30, 32 are alternately disposed in spaces 40 around each of the turns of the main conductive wire 28.

It is assumed that eight turns of the main conductive wire 28 are wound in each of the odd-numbered layers and seven turns of the main conductive wire 28 are wound in each of the even-numbered layers. The turns of the main conductive wire 28 are denoted by 28 with suffixes represented by successive alphabetical letters, e.g., 28*a*, 28*b*, 28*c*, . . . . For example, turns 28*a* through 28*h* turns of the main conductive wire 28 are wound in the first layer, and turns 28*i* through 28*o* turns of the main conductive wire 28 are wound in the second layer.

Figure 5:
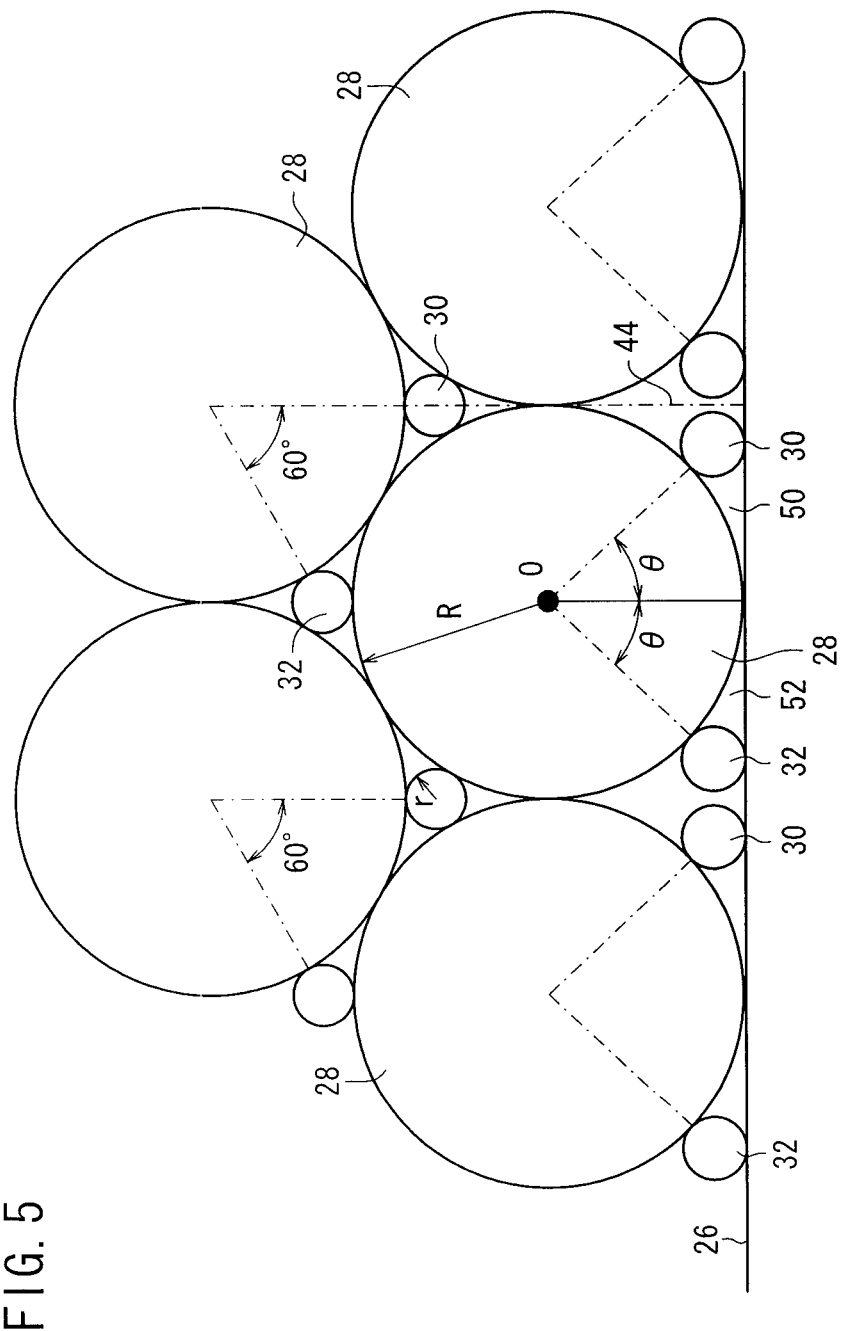
FIG. 5 is an enlarged partial cross-sectional view of the coil according to the first embodiment.

As shown in FIG. 5, two turns of the auxiliary conductive wires 30, 32 are associated with each turn of the main conductive wire 28 in the first layer. Those two turns include respective turns of the auxiliary conductive wires 30, 32 which are disposed in respective positions that are disposed on opposite sides of and angularly spaced by identical angles θ from a line 44 which extends through the center O of the turn of the main conductive wire 28 normal to the bottom surface of the bobbin 26 on which the coil 20 is wound. Three turns of the auxiliary conductive wires 30, 32 are associated with each turn of the main conductive wire 28 in the second and subsequent layers. Those three turns include a turn of the auxiliary conductive wire 30 disposed on the line 44 and two turns of the auxiliary conductive wire 32 which are disposed in respective positions that are disposed on opposite sides of and angularly spaced by identical angles of 60° from the line 44.

In other words, in the second and subsequent layers, the three turns of the auxiliary conductive wires 30, 32 are held against the associated turn of the main conductive wire 28 in three points located in an angular interval of 120°.

Stated otherwise, the turn 28*e*, for example, of the main conductive wire 28 in the first layer is associated with respective turns of the auxiliary conductive wires 30, 32 which are disposed respectively in a first space 50 and a second space 52 that are surrounded by the adjacent turns 28*d*, 28*f* in the first layer and the bobbin 26. The turn 28*m*, for example, of the main conductive wire 28 in the second layer is associated with a turn of the auxiliary conductive wire 30 which is disposed in a third space 54 surrounded by the turn 28*m* and the adjacent turns 28*e*, 28*f* in the first layer, and a turn of the auxiliary conductive wire 32 which is disposed in a fourth space 56 surrounded by the turn 28*m*, the adjacent turn 28*n* in the second layer, and the adjacent turn 28*f* in the first layer.

Each turn of the main conductive wire 28 in the second and subsequent layers and the associated turns of the auxiliary conductive wires 30, 32 jointly make up a hexagonal close-packed structure. Each triad of turns of the main conductive, wire 28 which are held in contact with each other defines a space therebetween, and the diameter of a circle that is positioned in the space and held in contact with the three turns in three points serves as the maximum diameter of a turn of the auxiliary conductive wire 30 or 32 which is disposed in the space. Specifically, the radius r of the auxiliary conductive wires 30, 32 is related to the radius R of the main conductive wire 28 according to the equation $(R+r)\cos(30°)=R$, and is given as $r \approx 0.154R$ by solving the equation for r.

In the first layer, the angles θ by which the turns of the auxiliary conductive wires 30, 32 are angularly spaced from the line 44 passing through the center of the associated turn of the main conductive wire 28 are given as θ=42.8° by solving the equation $(R+r)\cos θ = R-r$ for r.

If the number of turns of the main conductive wires 28 is N, then the total number of turns of the auxiliary conductive wires 30, 32 is 2N. If $r \approx 0.154R$, then the cross-sectional area S occupied by the turns of the main conductive wire 28 is expressed as $S=\pi R^2 \times N$ and the cross-sectional area s occupied by the turns of the auxiliary conductive wires 30, 32 is expressed as $s=\pi r^2 \times 2N \approx \pi(0.154R)^2 \times 2N$. The space factor is increased at a ratio $\delta=s/S \approx (\pi(0.154R)^2 \times 2N)/(\pi R^2 \times N) = 0.0474$. Therefore, the space factor is increased by about 4.7%.

Accordingly, the turns of the auxiliary conductive wires 30, 32 can efficiently be packed in the spaces between the turns of the main conductive wires 28 that are wound in arrays. The spaces between the coil turns are reduced in cross-sectional area, and the space factor of the coil 20 is increased. Therefore, the rotary electric machine incorporating the stator 10 therein has increased performance and output levels.

The turns of the auxiliary conductive wires 30, 32 are placed on different angular positions around the associated turns of the main conductive wire 28 in the first layer and the second and subsequent layers. The turns of the auxiliary conductive wires 30, 32 can efficiently be packed in the gaps between the turns of the main conductive wires 28 that are wound in arrays. The gaps between the coil turns are reduced in cross-sectional area, and the space factor of the coil 20 is increased. Therefore, the rotary electric machine incorporating the stator 10 therein has increased performance and output levels.

In the first layer, the turns of the auxiliary conductive wires 30, 32 which are associated with each of the turns of the main conductive wire 28 are disposed on opposite sides of and angularly spaced by identical angles □ from the line 44 passing through the center of the turn of the main conductive wire 28. In the second and subsequent layers, a turn of the auxiliary conductive wire 30 is disposed on the line 44 passing through the center of each turn of the main conductive wire 28, and two turns of the auxiliary conductive wire 32 are disposed in respective positions that are disposed on opposite sides of and angularly spaced by identical angles of 60° from the line 44. Consequently, the auxiliary conductive wires 30, 32 are efficiently wound well in balance for an increased space factor.

A stator manufacturing apparatus 100 (see FIG. 6) for winding the main conductive wire 28 and the auxiliary conductive wires 30, 32 around the bobbin 26 of each separate core 12 will be described below.

Figure 6:
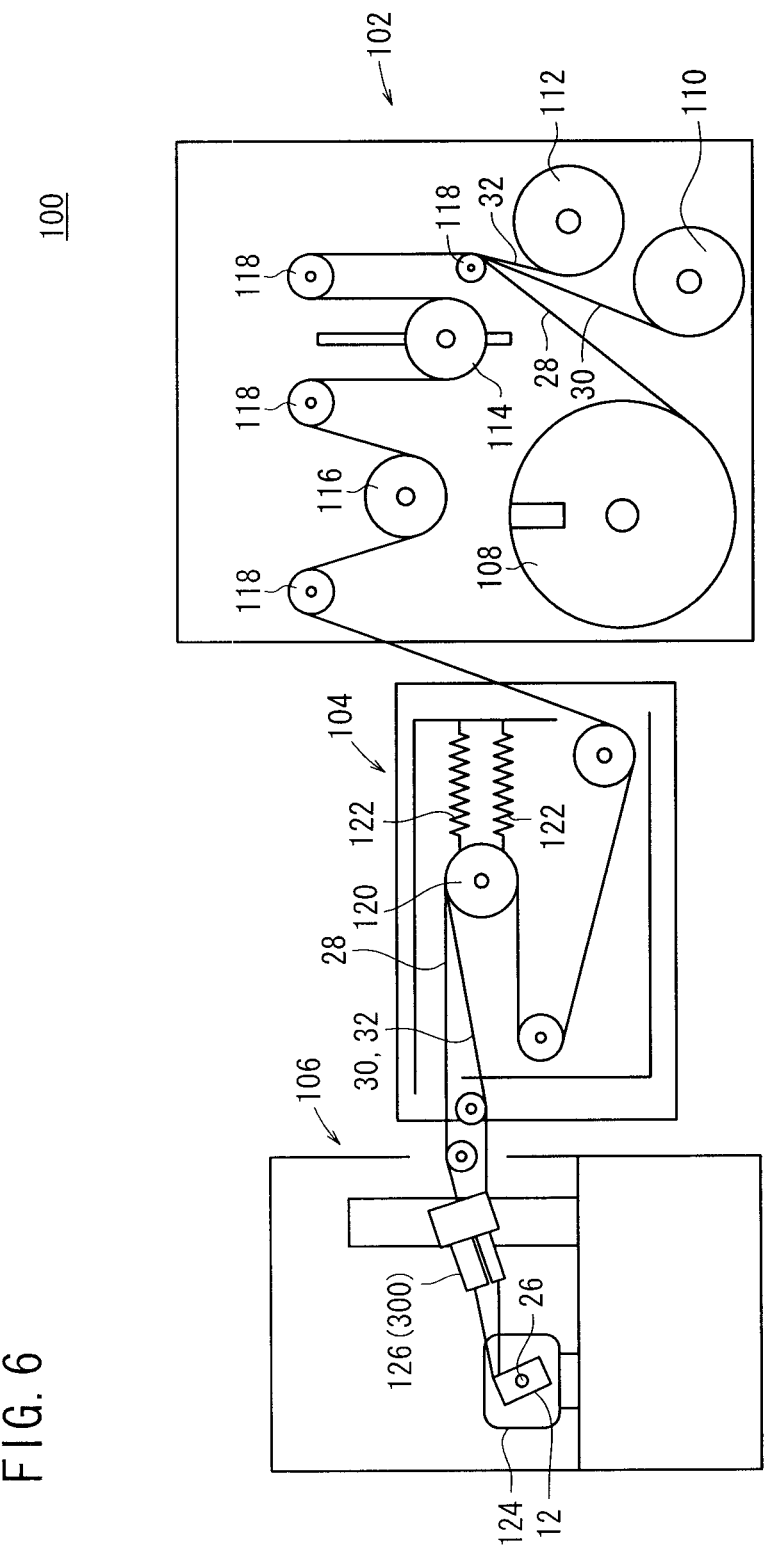
FIG. 6 is a schematic front elevational view of an apparatus for manufacturing a stator according to the first embodiment.

As shown in FIG. 6, the stator manufacturing apparatus 100 comprises a conductive wire supply 102, a back tensioner 104, and a coil winder 106.

The conductive wire supply 102 comprises a main drum 108 for supplying the main conductive wire 28, a pair of auxiliary drums 110, 112 for supplying the auxiliary conductive wires 30, 32, respectively, a wire feed roller 114, a brake roller 116, and a plurality of idle rollers 118. When lengths of the main conductive wire 28 and the auxiliary conductive wires 30, 32 are supplied from the back tensioner 104, the wire feed roller 114 draws out corresponding lengths of the main conductive wire 28 and the auxiliary conductive wires 30, 32 under spring forces. At this time, the wire feed roller 114 ascends. The distance that the wire feed roller 114 has ascended is detected by a controller, not shown, which controls servomotors, not shown, to rotate the main drum 108 and the auxiliary drums 110, 112 through corresponding angles.

The brake roller 116 comprises a frictional roller for imparting a certain level of static tension to the main conductive wire 28 and the auxiliary conductive wires 30, 32 as they are supplied from the wire feed roller 114.

The back tensioner 104 includes a roller 120 around which the main conductive wire 28 and the auxiliary conductive wires 30, 32 are trained and a pair of springs 122 acting on the roller 120. The spring-loaded roller 120 serves to absorb tension variations caused on the main conductive wire 28 and the auxiliary conductive wires 30, 32 due to their shapes.

The coil winder 106 comprises a bobbin rotating means 124 for rotating the bobbin 26 of the separate core 12, and a composite nozzle assembly (nozzle mechanism) 126 for supplying the main conductive wire 28 and the auxiliary conductive wires 30, 32 to the bobbin 26.

Figure 7:
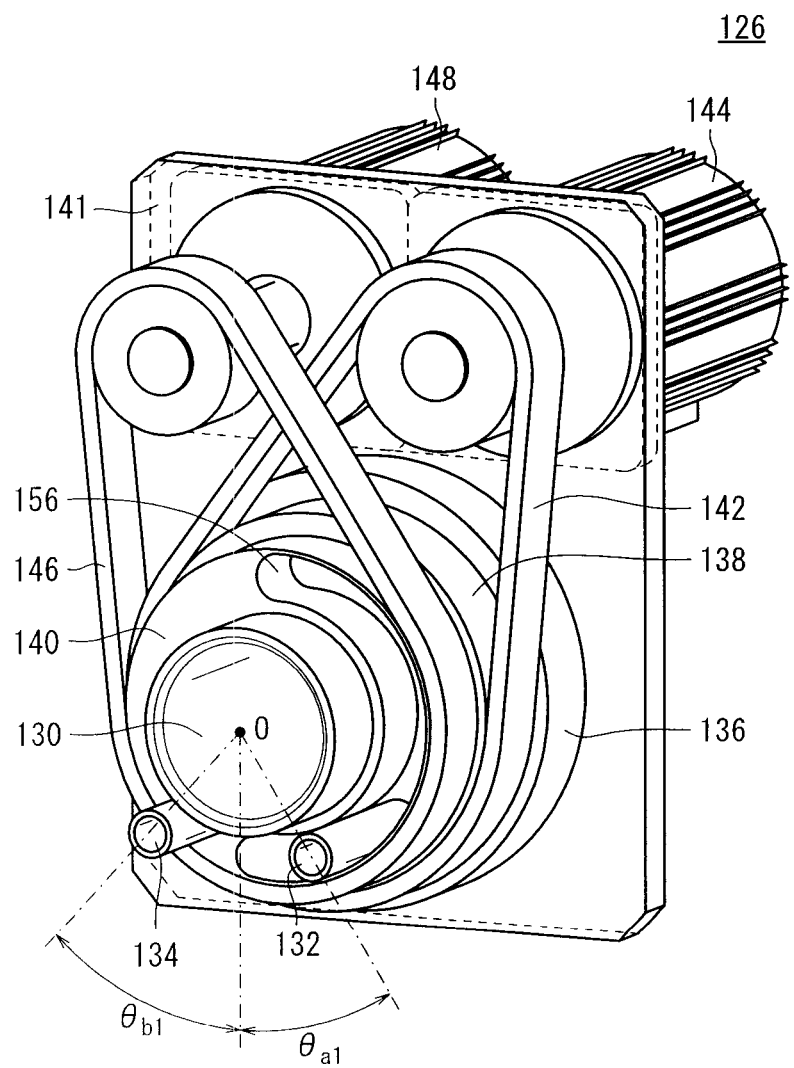
FIG. 7 is a perspective view of a composite nozzle assembly according to the first embodiment for winding a first layer.
Figure 8:
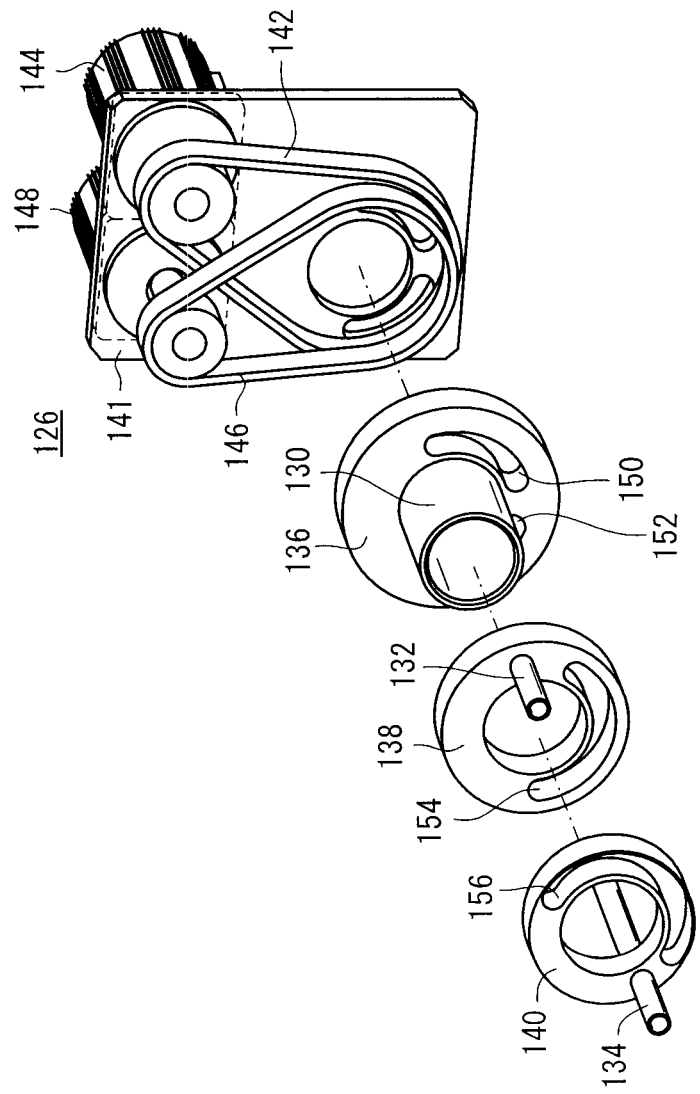
FIG. 8 is an exploded perspective view of the composite nozzle assembly according to the first embodiment as viewed in a first direction.
Figure 9:
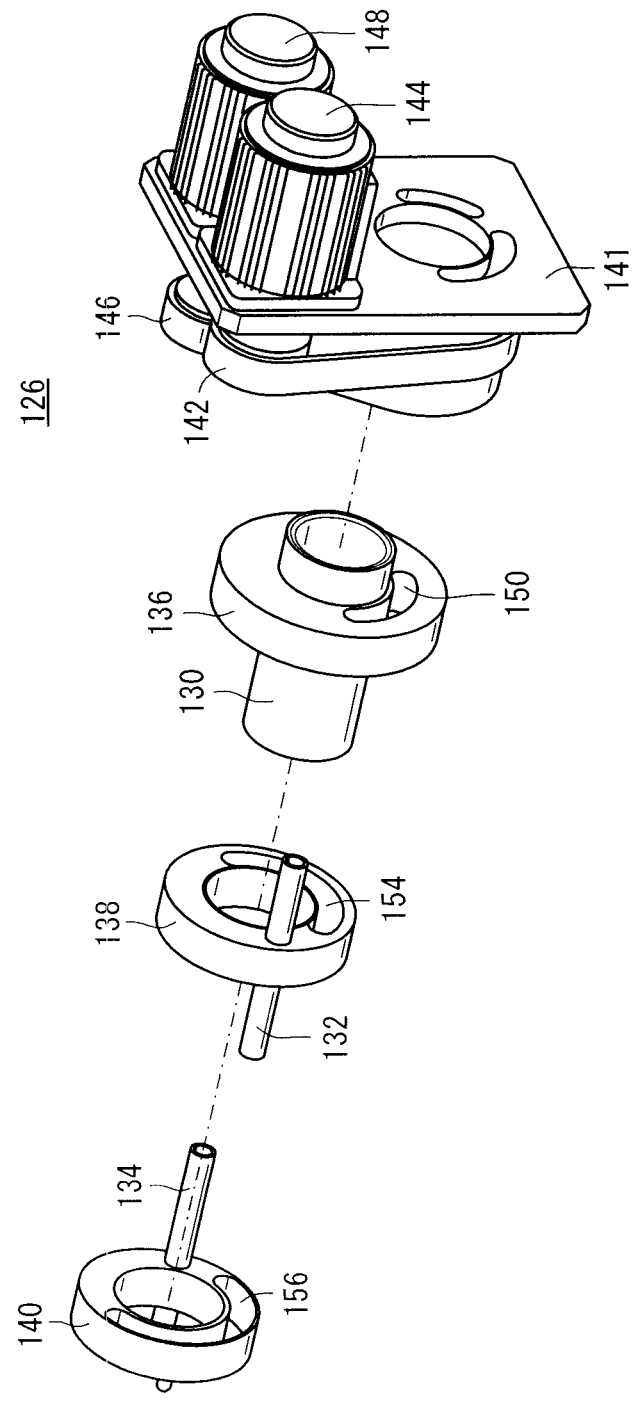
FIG. 9 is an exploded perspective view of the composite nozzle assembly according to the first embodiment as viewed in a second direction.

As shown in FIGS. 7, 8, and 9, the composite nozzle assembly 126 comprises a main nozzle 130 for guiding the main conductive wire 28, a pair of auxiliary nozzles 132, 134 for guiding the auxiliary conductive wires 30, 32, respectively, a main ring 136 fixed concentrically to the main nozzle 130, an auxiliary ring (nozzle moving means, rotor) 138 fitted over the main nozzle 130 with the auxiliary nozzle 132 being fixed on a circumferential edge of the auxiliary ring 138, an auxiliary ring (nozzle moving means, rotor) 140 fitted over the main nozzle 130 with the auxiliary nozzle 134 being fixed on a circumferential edge of the auxiliary ring 140, an auxiliary nozzle control motor 144 for rotating the auxiliary ring 138 through a belt 142, and an auxiliary nozzle control motor 148 for rotating the auxiliary ring 140 through a belt 146.

The auxiliary rings 138, 140 that are fitted over the main nozzle 130 are individually rotatable about the main nozzle 130 to move the auxiliary nozzles 132, 134 for guiding the auxiliary conductive wires 30, 32 positionally with respect to the main conductive wire 28 that is guided by the fixed main nozzle 130.

The auxiliary nozzles 132, 134 are axially parallel to the main nozzle 130 closely thereto. The auxiliary nozzles 132, 134 are circumferentially movable around the main conductive wire 28 guided by the main nozzle 130 thereby to guide the auxiliary conductive wires 30, 32. The main nozzle 130 and the auxiliary nozzles 132, 134 are of the same axial length. The main ring 136 and the auxiliary nozzle control motors 144, 148 are fixedly mounted on a base plate 141. The auxiliary nozzle control motors 144, 148 comprise small-sized motors such as servomotors, stepping motors, or the like whose angular displacements are controllable. The belts 142, 146 may be replaced with chains, gears, or the like.

The main ring 136, the auxiliary ring 138, and the auxiliary ring 140 are axially stacked together and have successively smaller diameters with the main ring 136 being of the greatest diameter and the auxiliary ring 140 of the smallest diameter.

The main ring 136 has an arcuate slot 150 defined therein through which the auxiliary nozzle 132 passes and an arcuate slot 152 defined therein through which the auxiliary nozzle 134 extends. The auxiliary ring 138 has an arcuate slot 154 defined therein through which the auxiliary nozzle 134 extends. The auxiliary ring 140 has an arcuate slot 156 defined therein through which the auxiliary nozzle 132 extends.

The auxiliary nozzles 132, 134 are circumferentially movable in angular ranges limited by the arcuate slots 150, 152, 154, 156 about the main nozzle 130.

The arcuate slot 150 provides an angular range from 0° to at least 90° in which the auxiliary nozzle 132 is angularly movable. The arcuate slot 152 provides an angular range from 42.8° to 90° in which the auxiliary nozzle 134 is angularly movable.

The arcuate slot 154 provides an angular range from 42.8° to at least 90° in which the auxiliary nozzle 134 is angularly movable, and also provides an angular range from 0° to at least 90° in which the auxiliary nozzle 132 is angularly movable. The arcuate slot 156 provides an angular range from 0° to at least 90° in which the auxiliary nozzle 132 is angularly movable, and also provides an angular range from 42.8° to 90° in which the auxiliary nozzle 134 is angularly movable.

The composite nozzle assembly 126 operates to move the auxiliary nozzles 132, 134 depending on the latest layer wound of turns of the main conductive wire 28 supplied from the main nozzle 130 to place turns of the auxiliary conductive wires 30, 32 in the gaps between the turns of the main conductive wire 28 for a higher space factor.

Specifically, for winding the first layer around the bobbin 26, as shown in FIG. 7, the auxiliary nozzles 132, 134 of the composite nozzle assembly 126 are disposed in respective positions that are angularly spaced from a downward central line from the center of the main nozzle 130 by respective angles $\theta a_1$, $\theta b_1$. Basically, the angles $\theta a_1$, $\theta b_1$ are equal to $\theta=42.8°$ to hold the auxiliary nozzles 302, 304 in symmetrical positions. However, the angles $\theta a_1$, $\theta b_1$ may individually be changed depending on design conditions or trial adjustments.

Figure 10:
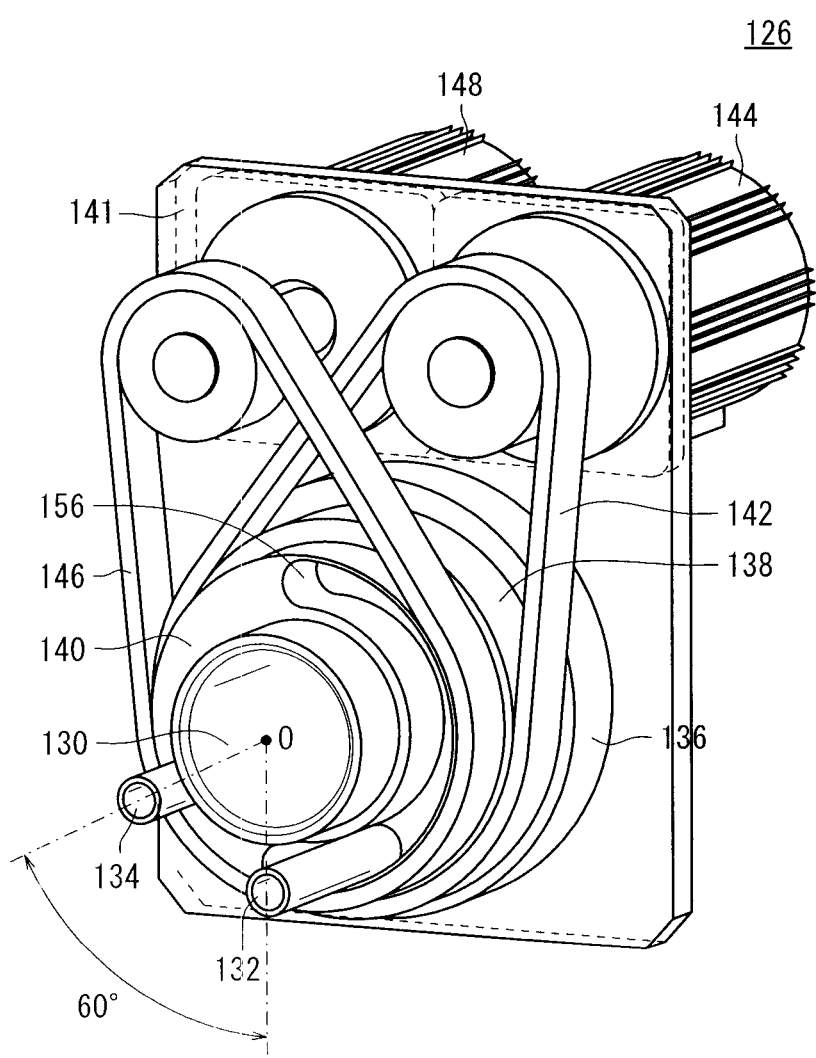
FIG. 10 is a perspective view of the composite nozzle assembly according to the first embodiment for winding second and subsequent layers.

For winding the second and subsequent layers around the bobbin 26, as shown in FIG. 10, the auxiliary nozzle 132 is angularly moved by 42.8° to a position on the downward central line directly below the center of the main nozzle 130, and the auxiliary nozzle 134 is angularly moved to a position which is angularly spaced from the downward central line from the center of the main nozzle 130 by 60°. In other words, the auxiliary nozzle 134 is angularly moved by 60°−42.8°=17.2°.

When the winding process shifts from the first layer to the second layer, therefore, the auxiliary nozzles 132, 134 change their angular positions as described above. Therefore, when the first turn 28*i* (see FIG. 4) of the main conductive wire 28 in the second layer is wound around the bobbin 26, the auxiliary conductive wire 30 is placed in the gap between the turns 28*a*, 28*b*, and the auxiliary conductive wire 32 is placed in the gap between the turns 28*b*, 28*i*. At this time, the auxiliary nozzles 132, 134 stay in synchronism with each other.

Basically, the auxiliary nozzles 132, 134 are in their respective angular positions 0°, 60°. However, their angular positions may individually be changed depending on design conditions or trial adjustments.

For winding the second and subsequent layers, since the auxiliary conductive wires 30, 32 are kept in geometrically the same positions with respect to the main conductive wire 28, the auxiliary nozzles 132, 134 remain essentially in the same positions.

When the final turn 28*w* of the main conductive wire 28 in the third layer is wound, the auxiliary conductive wire 32 is brought into geometrical interference with a bobbin wall 26*a*. Actually, however, the auxiliary conductive wire 32 falls on its own into a space 60 surrounded by the bobbin wall 26*a* and the turns 28*h*, 28*o*, 28*w* of the main conductive wire 28.

The auxiliary conductive wire 30 which is associated with the turns 28*p*, 28*w* of the main conductive wire 28 in the third layer is displaced at its opposite ends is displaced on its own to stable positions as indicated by the imaginary lines in spaces 60, 62.

A stator 200 according to a second embodiment of the present invention and a composite nozzle assembly 300 of an apparatus for manufacturing the stator 200 will be described below with reference to FIGS. 11 through 16. Those parts of the stator 200 and the composite nozzle assembly 300 which are identical to the stator 10 and the composite nozzle assembly 126 according to the first embodiment are denoted by identical reference characters, and will not be described in detail below.

Figure 11:
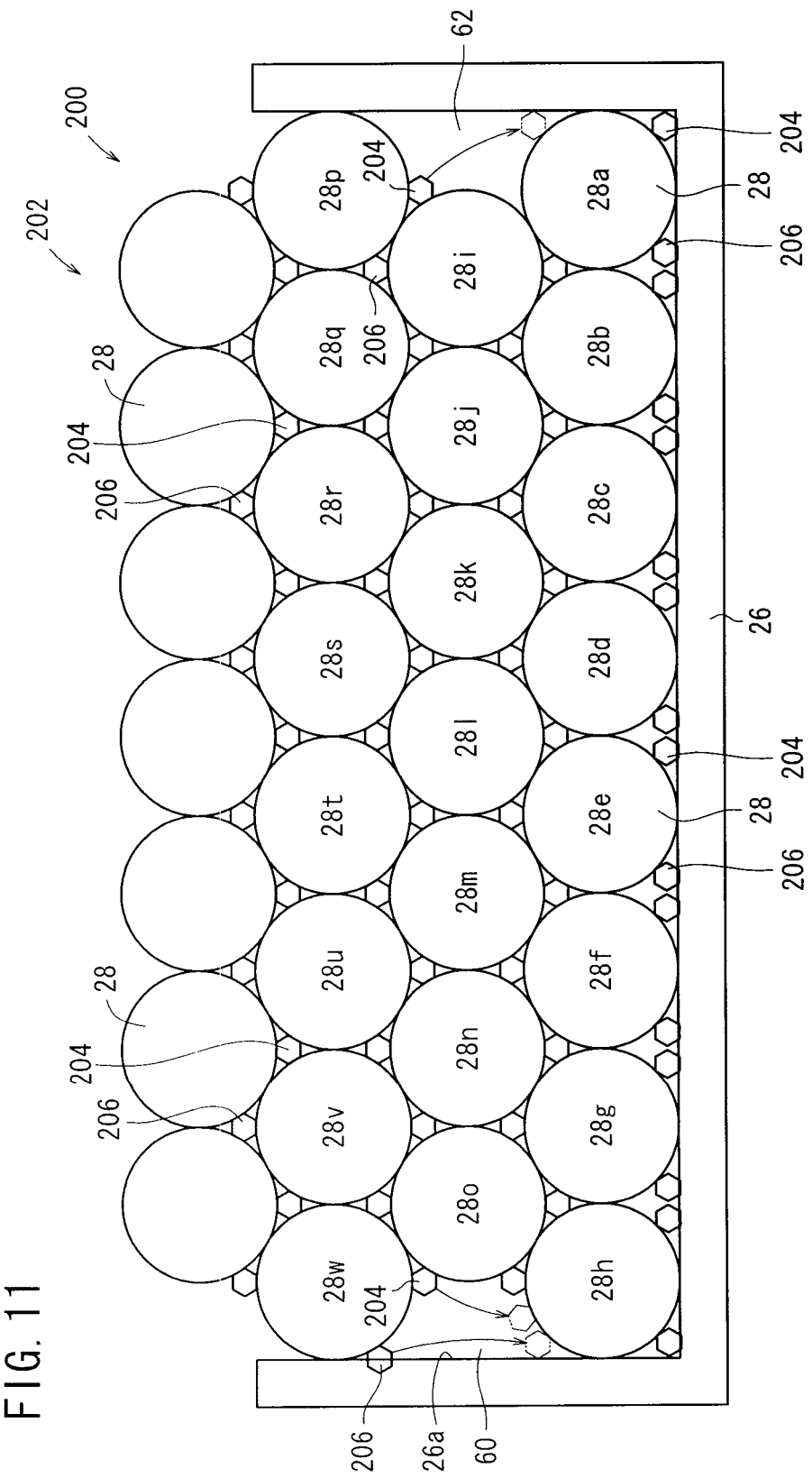
FIG. 11 is a cross-sectional view of a coil according to a second embodiment of the present invention.
Figure 12:
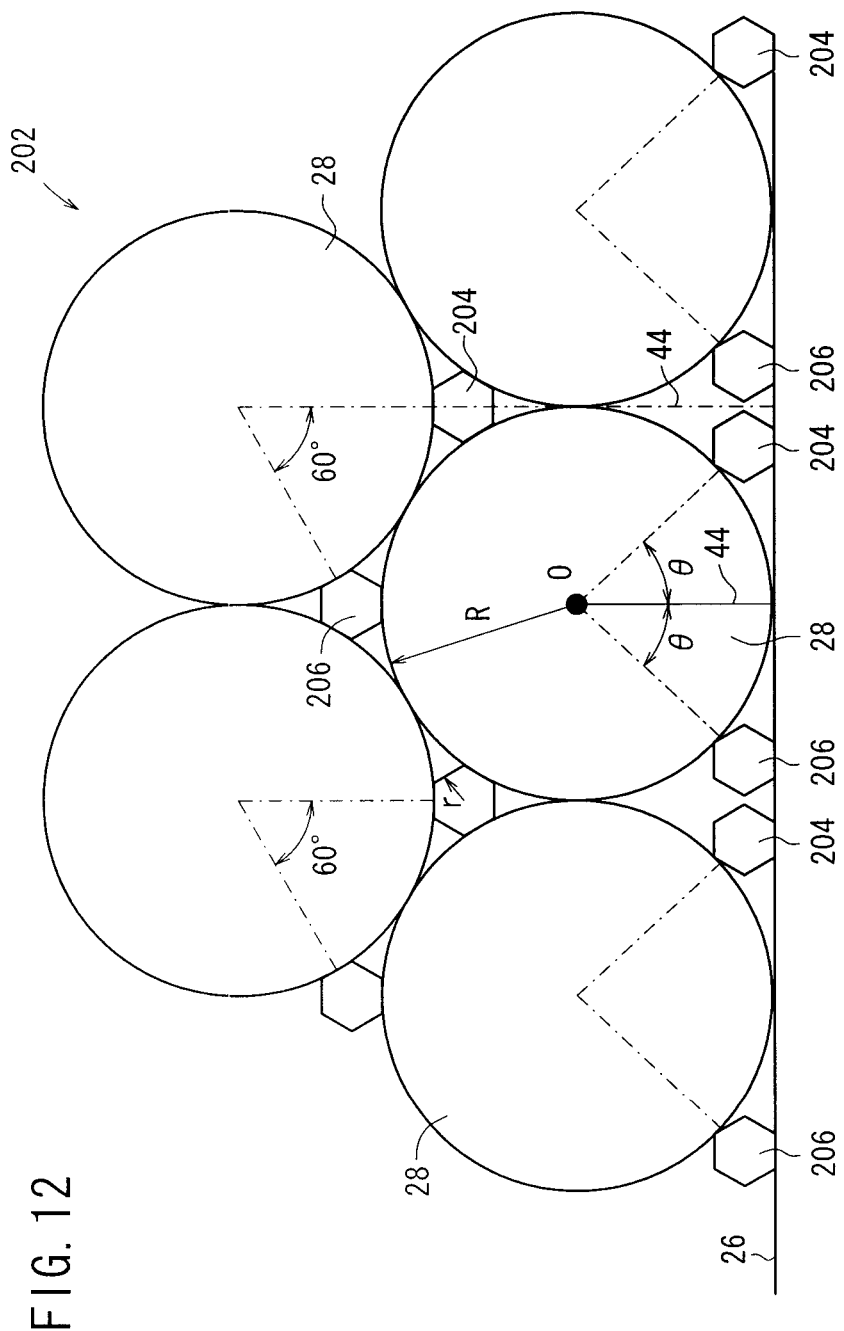
FIG. 12 is an enlarged partial cross-sectional view of the coil according to the second embodiment.

As shown in FIGS. 11 and 12, each separate core 202 of the stator 200 corresponds to the separate core 12 according to the first embodiment, and is different from the separate core 12 in that the auxiliary conductive wires 30, 32 which have a circular cross section are replaced with auxiliary conductive wires 204, 206 having a regular hexagonal cross section. Since a regular hexagonal shape is closer to a circular shape than a triangular shape and a square shape, the auxiliary conductive wires 204, 206 are made easily applicable by modifying an existing stator manufacturing apparatus. The auxiliary conductive wires 204, 206 which have already been shaped into a regular hexagonal cross section may be installed on the auxiliary drums 110, 112 (see FIG. 6), or alternatively, round auxiliary conductive wires may be shaped into a regular hexagonal cross section somewhere in the winding process performed by the stator manufacturing apparatus.

Two turns of the auxiliary conductive wires 204, 206 are associated with each turn of the main conductive wire 28 in the first layer. Those two turns include respective turns of the auxiliary conductive wires 204, 206 which are disposed in respective positions that are disposed on opposite sides of and angularly spaced by identical angles from the line 44 which extends through the center O of the turn of the main conductive wire 28 normal to the bottom surface of the bobbin 26 on which the coil 20 is wound. One side of the hexagonal shape of each of the turns of the auxiliary conductive wires 204, 206 is held in contact with the bottom surface of the bobbin 26.

Three turns of the auxiliary conductive wires 204, 206 are associated with each turn of the main conductive wire 28 in the second and subsequent layers. Those three turns include a turn of the auxiliary conductive wire 204 disposed on the line 44 and two turns of the auxiliary conductive wire 206 which are disposed in respective positions that are disposed on opposite sides of and angularly spaced by identical angles of 60° from the line 44. In other words, in the second and subsequent layers, the three turns of the auxiliary conductive wires 204, 206 are held against the associated turn of the main conductive wire 28 in three sides located in an angular interval of 120°. In a strict geometrical sense, the turns of the auxiliary conductive wires 204, 206 are held in contact with the main conductive wires 28 in three points. Generally, however, respective three sides of the turns of the auxiliary conductive wires 204, 206 are stably held in contact with the main conductive wires 28 in three sides. Each turn of the main conductive wire 28 in the second and subsequent layers and the associated turns of the auxiliary conductive wires 204, 206 jointly make up a hexagonal close-packed structure. Each triad of turns of the main conductive wire 28 which are held in contact with each other defines a space therebetween, and the diameter of a circle that is positioned in the space and held in contact with the three turns in three points serves as the maximum diameter of a turn of the auxiliary conductive wire 204, 206 which is disposed in the space. Specifically, the radius r (the distance from the center to each side) of the auxiliary conductive wires 204, 206 is related to the radius R of the main conductive wire 28 is given as r≈0.154R as is the case with the stator 10 according to the first embodiment.

In the first layer, the angles θ by which the turns of the auxiliary conductive wires 204, 206 are angularly spaced from the line 44 passing through the center of the associated turn of the main conductive wire 28 are given as θ=44.5° by solving the equation R·cos θ=R−r−r·cos(30°) for r.

If the number of turns of the main conductive wires 28 is N, then the total number of turns of the auxiliary conductive wires 204, 206 is 2N. If r≈0.154R, then the cross-sectional area S occupied by the turns of the main conductive wire 28 is expressed as S=πR²×N and the cross-sectional area s occupied by the turns of the auxiliary conductive wires 204, 206 is expressed as s=2/√(3r)×r/2×6×2N. The space factor is increased at a ratio δ=s/S≈(2/√(3r)×r/2×6×2N)/(πR²×N)= 0.0523. Therefore, the space factor is increased by about 5.2%.

As shown in FIG. 12, the auxiliary conductive wires 204, 206 are wound in the same orientation in each layer such that one side of the hexagonal shape lies parallel to the bottom surface of the bobbin 26.

The stator 200 and the separate core 202 are identical in appearance to the stator 10 and the separate core 12 according to the first embodiment. Therefore, the appearance of the stator 200 and the separate core 202 is omitted from illustration.

A stator manufacturing apparatus for manufacturing the separate core 202 will be described below. The stator manufacturing apparatus for manufacturing the separate core 202 is different from the stator manufacturing apparatus 100 according to the first embodiment in that the composite nozzle assembly 126 of the stator manufacturing apparatus 100 is replaced with a composite nozzle assembly 300 shown in FIGS. 13, 14, and 15.

Figure 13:
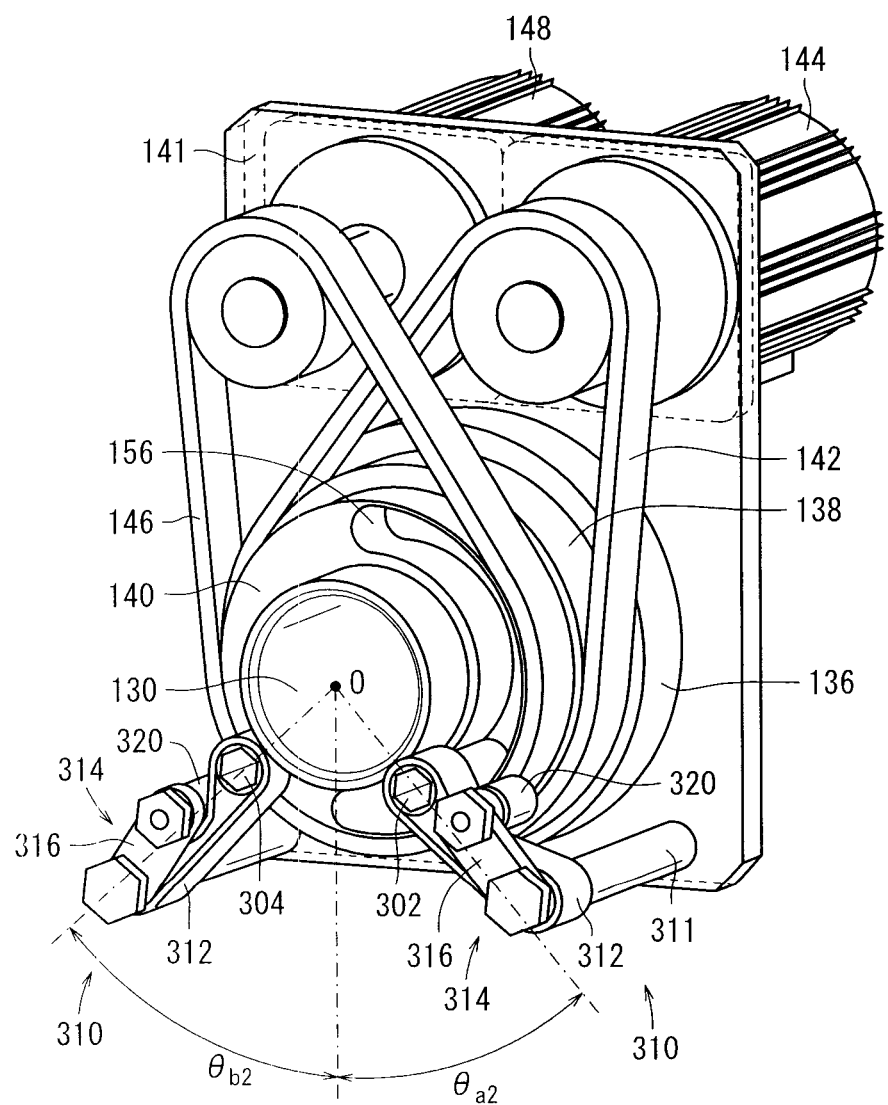
FIG. 13 is a perspective view of a composite nozzle assembly according to the second embodiment for winding a first layer.
Figure 14:
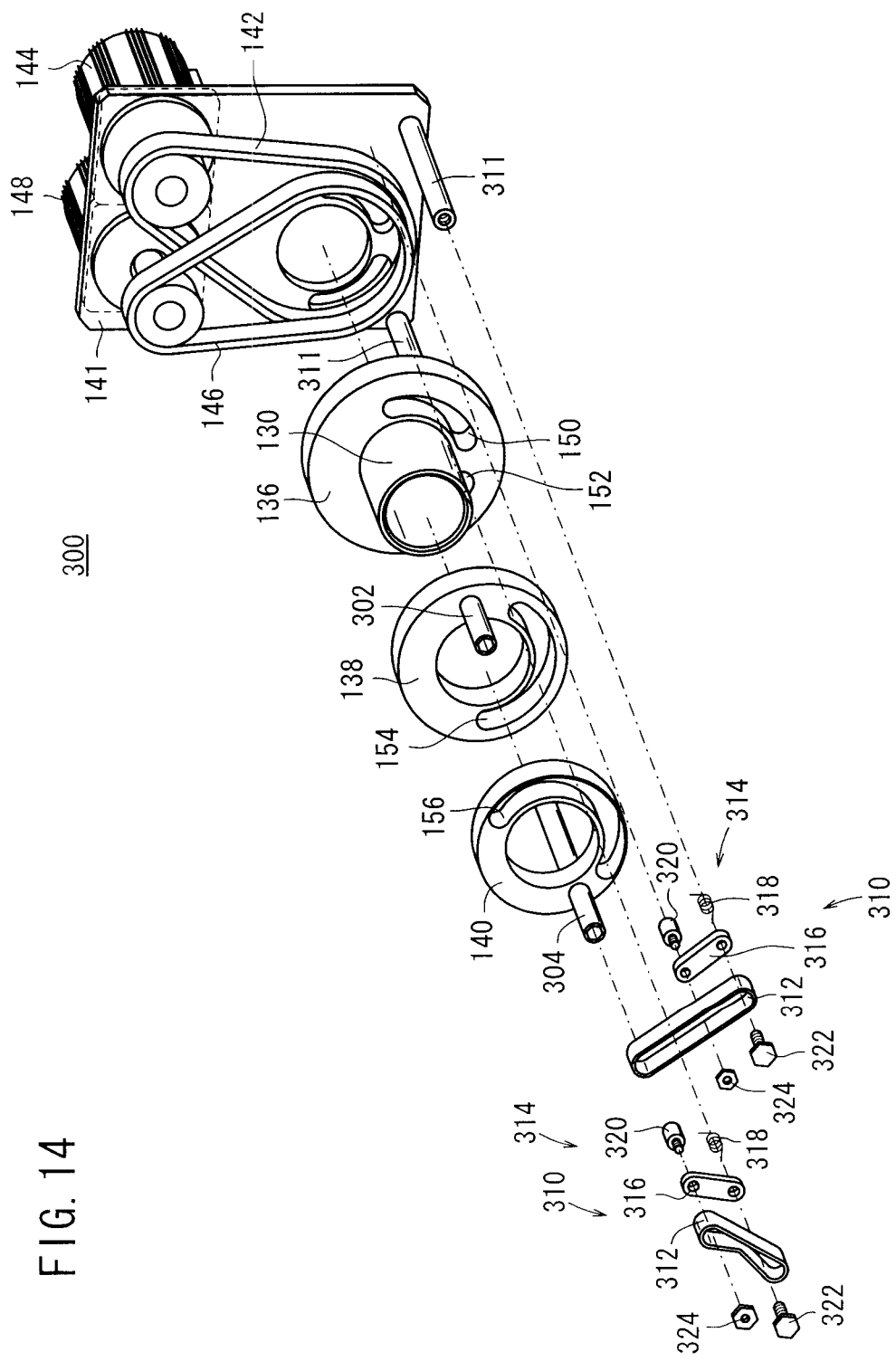
FIG. 14 is an exploded perspective view of the composite nozzle assembly according to the second embodiment as viewed in a first direction.
Figure 15:
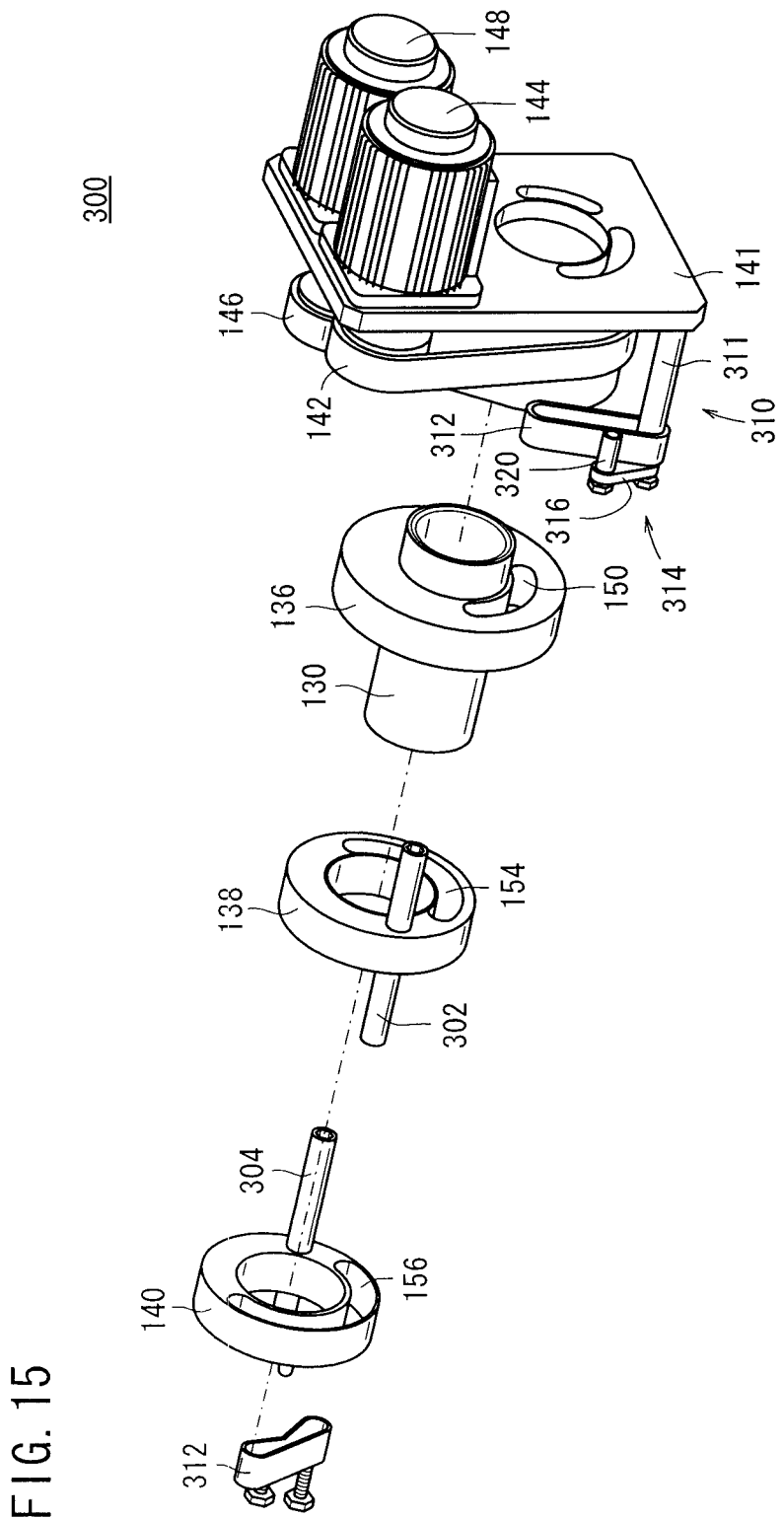
FIG. 15 is an exploded perspective view of the composite nozzle assembly according to the second embodiment as viewed in a second direction.

As shown in FIGS. 13 through 15, the composite nozzle assembly 300 comprises a main nozzle 130, a pair of auxiliary nozzles 302, 304 for guiding the auxiliary conductive wires 204, 206, respectively, a main ring 136, an auxiliary ring 138, an auxiliary ring 140, an auxiliary nozzle control motor 144, and an auxiliary nozzle control motor 148. The auxiliary nozzles 302, 304 are rotatably mounted on the respective auxiliary rings 138, 140. The auxiliary nozzles 302, 304 are similar in outer profile to the auxiliary nozzles 132, 134, but are different from the auxiliary nozzles 132, 134 in that the auxiliary nozzles 302, 304 have respective nozzle openings of a hexagonal cross section. The nozzle openings thus shaped are effective to orient the hexagonal auxiliary conductive wires 204, 206 for stably paying out them from the auxiliary nozzles 302, 304.

The main ring 136 and the auxiliary rings 138, 140 have arcuate slots 150, 152, 154, 156 which are essentially identical in shape to those of the composite nozzle assembly 126 according to the first embodiment, except that the angular ranges provided by the arcuate slots 152, 154, 156 start from 44.5° instead of 42.8°.

The composite nozzle assembly 300 also has a pair of angle adjusting mechanisms 310 for holding the auxiliary nozzles 302, 304 in a predetermined orientation. The angle adjusting mechanisms 310 comprise respective posts 311 projecting from a base plate 141, respective belts 312 disposed around the distal ends of the respective posts 311, and respective tensioners 314 for tensioning the respective belts 312. The belts 312 are trained around and extend between the posts 311 and the auxiliary nozzles 302, 304.

Each of the tensioners 314 comprises an arm 316 tiltably mounted on the distal end of the post 311, a torsion spring 318 for torsionally biasing the arm 316, and a tension roller 320 mounted on the distal end of the arm 316. The arm 316 is normally biased to move inwardly of the composite nozzle assembly 300 by the torsion spring 318, causing the tension roller 320 to press the belt 312 under tension. The angle adjusting mechanisms 310 are assembled by bolts 322 and nuts 324.

The posts 311 and the auxiliary nozzles 302, 304 are of the same diameter for keeping the auxiliary nozzles 302, 304 in their reference angular positions. The posts 311 may be non-rotatably fixed to the base plate 141, or may be rotatably mounted on the base plate 141 such that they can be rotated about their own axes by respective motors for adjusting the orientation of the auxiliary nozzles 302, 304.

The angle adjusting mechanisms 310 are effective to reduce damage on the auxiliary conductive wires 30, 32, e.g., damage on the insulating coatings on the surfaces of the auxiliary conductive wires 30, 32 for thereby increasing the quality of the stator 200. The angle adjusting mechanisms 310 are also effective to set the auxiliary conductive wires 30, 32 stably to an appropriate orientation.

The composite nozzle assembly 300 operates as follows: For winding the first layer around the bobbin 26, as shown in FIG. 13, the auxiliary nozzles 302, 304 are disposed in respective positions that are angularly spaced from a downward central line from the center of the main nozzle 130 by respective angles $\theta a_2$, $\theta b_2$. Basically, the angles $\theta a_2$, $\theta b_2$ are equal to $\theta=44.5°$ to hold the auxiliary nozzles 302, 304 in symmetrical positions. However, the angles $\theta a_2$, $\theta b_2$ may individually be changed depending on design conditions or trial adjustments.

Figure 16:
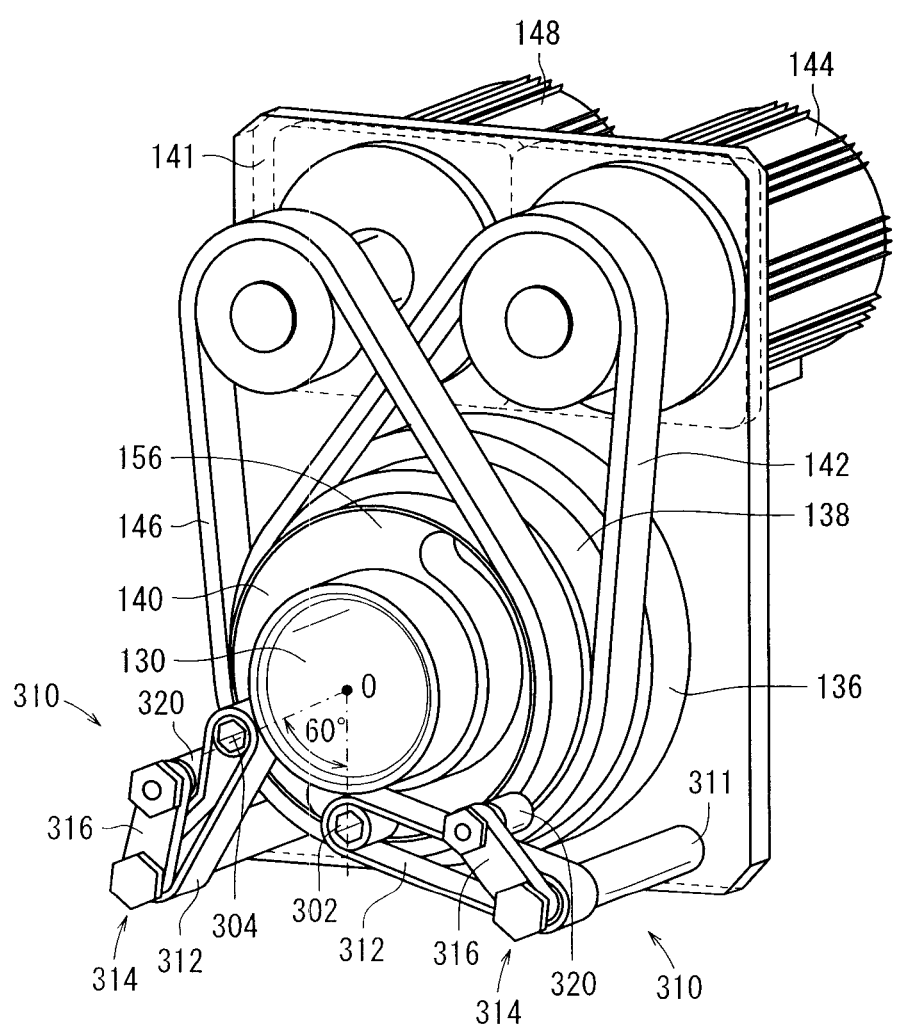
FIG. 16 is a perspective view of the composite nozzle assembly according to the second embodiment for winding second and subsequent layers.
Figure 17:
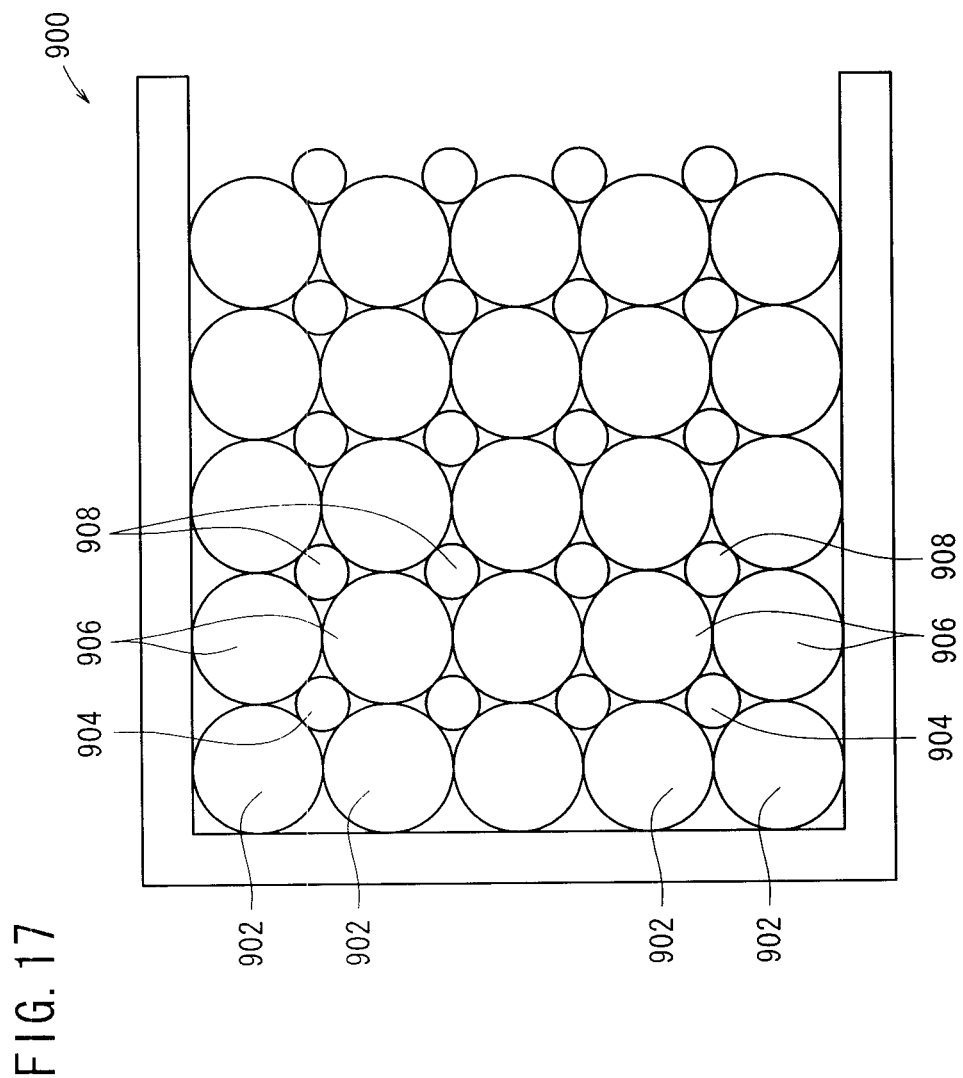
FIG. 17 is a cross-sectional view of a coil according to the related art.

For winding the second and subsequent layers around the bobbin 26, as shown in FIG. 16, the auxiliary nozzle 302 is angularly moved by 44.5° to a position on the downward central line directly below the center of the main nozzle 130, and the auxiliary nozzle 304 is angularly moved to a position which is angularly spaced from the downward central line from the center of the main nozzle 130 by 60°. In other words, the auxiliary nozzle 304 is angularly moved by 60°−44.5°=15.5°.

When the winding process shifts from the first layer to the second layer, therefore, the auxiliary nozzles 302, 304 change their positions as described above as is the case with the composite nozzle assembly 126. At this time, the auxiliary nozzles 302, 304 are kept in the same orientation as before by the angle adjusting mechanisms 310.

With the stators 10, 200 according to the above embodiments, the turns of the auxiliary conductive wires 30, 32 and 204, 206 can efficiently be packed in the spaces between the turns of the main conductive wires 28 that are wound in arrays. The spaces between the coil turns are reduced in cross-sectional area, and the space factor of the coil 20 is increased. Therefore, the rotary electric machine incorporating the stator 10 or 200 therein has increased performance and output levels.

With the stator manufacturing apparatus 100 according to the above embodiments, the turns of the auxiliary conductive wires 30, 32 and 204, 206 are placed on different angular positions around the associated turns of the main conductive wire 28 in the first layer and the second and subsequent layers. The turns of the auxiliary conductive wires 30, 32 and 204, 206 can efficiently be packed in the gaps between the turns of the main conductive wires 28 that are wound in arrays. The gaps between the coil turns are reduced in cross-sectional area, and the space factor of the coil 20 is increased. Therefore, the rotary electric machine incorporating the stator 10 or 200 therein has increased performance and output levels.

According to the present invention, if an existing stator manufacturing apparatus is modified by replacing its nozzle mechanism with the composite nozzle assembly 126 or 300, then it is capable of manufacturing a stator having a high space factor.

Although certain preferred embodiments of the present invention have been shown and described in detail, it should be understood that various changes and modifications may be made therein without departing from the scope of the appended claims.

The invention claimed is:

1. A stator comprising a coil of conductive wires wound around a bobbin,
wherein the conductive wires include a main conductive wire, a first auxiliary conductive wire, and a second auxiliary conductive wire, each of said first and second auxiliary conductive wires being associated with the main conductive wire and being thinner than the main conductive wire,
wherein the main conductive wire is wound as turns arranged in arrays in a plurality of layers including at least first, second, and third layers, said first layer being adjacent the bobbin, said second layer being upwardly adjacent said first layer, and said third layer being upwardly adjacent said second layer, with adjacent turns of the main conductive wire in each of the first and second layers being in contact with one another and defining a valley therebetween that accommodates therein a turn of the main conductive wire in an upwardly adjacent layer,
wherein the first auxiliary conductive wire and the second auxiliary conductive wire, which are associated with turns of the main conductive wire in the first layer, are wound as turns disposed in a first space and a second space, said first and second spaces being surrounded by adjacent turns of the main conductive wire in the first layer and the bobbin, and
wherein, in the second and third layer, the first auxiliary conductive wire and the second auxiliary conductive wire, which are associated with one of the turns of the main conductive wire, are wound as turns disposed in a third space and a fourth space, respectively, the third space being surrounded by the associated one of the turns of the main conductive wire and adjacent turns of the main conductive wire in a layer that is downwardly adjacent the layer in which said associated one of the turns of the main conductive wire resides, and the fourth space being surrounded by the associated one of the turns of the main conductive wire, a turn adjacent to said associated one of the turns of the main conductive wire and in the same layer as said associated one of the turns of the main conductive wire, and a turn of the main conductive wire in the downwardly adjacent layer.

2. The stator according to claim 1, wherein the turns of the first auxiliary conductive wire and the second auxiliary conductive wire that are associated with one of the turns of the main conductive wire in the first layer are disposed in respective positions that are disposed on opposite sides of and angularly spaced by identical angles from a line which extends through the center of the one of the turns of the main conductive wire normal to a surface of the bobbin on which the coil is wound, and wherein the turns of the first auxiliary conductive wire and the second auxiliary conductive wire that are associated with one of the turns of the main conductive wire in the second and third layers include a turn disposed on the line and another turn disposed in a position that is angularly spaced by 60° from the line.

3. The stator according to claim 1, wherein each of the first auxiliary conductive wire and the second auxiliary conductive wire has a circular cross section.

4. The stator according to claim 1, wherein each of the first auxiliary conductive wire and the second auxiliary conductive wire has a hexagonal cross section.

* * * * *